United States Patent [19]

Machado

[11] Patent Number: 5,628,277
[45] Date of Patent: May 13, 1997

[54] HUMMINGBIRD FEEDER

[76] Inventor: José A. M. Machado, Rua da Invernada, 26, Carapicuíba - SP, Brazil, 06355-340

[21] Appl. No.: 530,512

[22] Filed: Sep. 19, 1995

[30] Foreign Application Priority Data

Sep. 20, 1994 [BR] Brazil .................... 7401485 U

[51] Int. Cl.⁶ .................................................. A01K 39/00
[52] U.S. Cl. ................................................... 119/72
[58] Field of Search .................... 119/72, 77, 57.8, 119/57.9, 52.3, 52.2

[56] References Cited

U.S. PATENT DOCUMENTS

| Re. 32,970 | 7/1989 | Furlani .................. 119/52.3 |
| 4,691,665 | 9/1987 | Hefner ................. 119/57.9 X |
| 4,901,673 | 2/1990 | Overstreet ............... 119/72 |
| 5,269,258 | 12/1993 | Brown ................... 119/57.9 |

*Primary Examiner*—Thomas Price
*Attorney, Agent, or Firm*—Darby & Darby

[57] ABSTRACT

A hummingbird feeder for preventing bees from feeding and eliminating the leaking of a sugar water solution has a reservoir, cover and an overflow collector. The reservoir has an open end and a closed end for receiving the solution. The cover has an open end and a closed end for retaining the solution within the reservoir when the open end of the cover engages the open end of the reservoir. The cover has at least one internal orifice which permits the birds access to the sugar water solution. The overflow collector has an open end and a closed end for receiving an overflow of the solution within the reservoir when the open end of the collector engages the closed end of the cover. The collector has at least one external orifice which coincides with the internal orifice. Both internal and external orifices have a diameter which allows the passage of a hummingbird's beak, but not the head of a bee.

19 Claims, 3 Drawing Sheets

HUMMINGBIRD FEEDER

FIELD OF THE INVENTION

This invention relates generally to a hummingbird feeder, and more specifically to a hummingbird feeder which prevents bees (apis mellifera) from feeding and at the same time, eliminates leakage of the sugar water solution contained within the feeder.

BACKGROUND OF THE INVENTION

Conventional hummingbird feeders provide sugared water to hummingbirds and other nectarvors, thereby attracting these birds to the neighboring areas for feeding. The feeders basically comprise a reservoir which contains a sugar water solution. The birds access the liquid by means of orifices provided near the base of the reservoir and attached to tubes running in a downward direction which are open at the lower end. Typically, the surface tension of the liquid keeps the sugar water solution from flowing freely.

Since bees can also easily access these feeders, the bees tend to gather around the feeders in large numbers. As a result, the birds are denied access to the feeders since they are afraid of bees. Furthermore, the bees endanger those persons who must fill or otherwise maintain the feeder. This risk is obviously increased if the bees in question are of the African or African-mixed varieties as their sting is more ferocious.

Another problem involves the leakage of the sugar water solution from the reservoir. This leakage occurs in feeders under various circumstances: when the feeder is handled, re-filled for use, rocked by the wind, being used by the bird since the animal's beak will break through the membrane formed by superficial surface tension of the solution, and especially by the warming of the volume of air present within the reservoir, causing the air to expand and expel the solution from the reservoir. This last effect is exacerbated if the feeder is placed in direct sunlight. The sugar water solution which is expelled will soil the floor or ground area on which it falls and draw ants. Eventually, the ants will locate the source of the sugar water solution and be drawn directly to the feeder, again deterring the birds.

The problems described often render the feeder impractical, causing many owners to stop using them. The hummingbird feeders currently available provide no solution to the cited problems, although some attempts to improve them have been made. For example, one such feeder provides access to the sugar water solution by means of a tube placed in a downward direction, the end of which is covered by a screen. The purpose of the screen is to deter bees from gaining access, while at the same time allowing access to the beaks of the hummingbirds. However, this system does not keep the solution from leaking. Moreover, when the sugar water leaks, the screen becomes wet from the sugar water solution, thus allowing the bees to have continuous access to the solution.

Another type of feeder has orifices near the base, over which a plate-shaped collector is seated to collect the water which overflows or is expelled. However, this system also fails to prevent bees from feeding on the sugar water solution and actually provides easier access than the prior example. Moreover, since the volume of the collector is much smaller than that of the feeder, the collector cannot hold all of the sugar water overflow. In the case of a large leakage, which often occurs when the air within the feeder expands due to warming, the ground or floor area is soiled.

Accordingly, it would be desirable to provide a hummingbird feeder which overcomes the above mentioned drawbacks by providing a feeder which prevents bees from feeding and also eliminates leakage of the sugar water solution stored within the reservoir.

SUMMARY OF THE INVENTION

Accordingly, it is an object of the present invention to provide an improved hummingbird feeder.

It is a further object of the present invention to provide a hummingbird feeder having orifices of an adequate diameter to allow hummingbirds to feed while preventing bees from feeding. These orifices are surrounded with figures of flowers. Preferably, the diameter of the orifices is 2.5 mm and the flower figures are painted in bright colors which attract the hummingbirds. Similarly, the distance between the cover and the collector should be greater than the length of the bee proboscis but smaller than the reach of the hummingbird beak and tongue system. Preferably, this distance is 8 mm.

The collector capacity should be similar to that of the reservoir. When in use, the orifices of the collector are designed to align with the orifices of the cover. In this way, the hummingbirds may introduce their beaks through the outermost orifices, reaching the orifices of the cover and sucking out the sugar water solution from within the reservoir. With this design, the bees cannot reach the liquid. The sugar water solution, which leaks out and is collected by the collector and prevented from spilling to the ground.

Accordingly, a hummingbird feeder is provided that solves the two main problems affecting hummingbird feeders currently in use, preventing bees from feeding and preventing the leakage of the sugar water solution.

In carrying out the above and other objects of the invention in one form, there is provided a hummingbird feeder preferably comprising a reservoir having an open end and a closed end for receiving the solution, a cover having an open end and a closed end for retaining the solution within the reservoir when the open end of the cover engages the open end of the reservoir, the cover having at least one internal orifice which permits access to the solution; and an overflow collector having an open end and a closed end for receiving an overflow of the solution within the reservoir when the open end of the collector engages the closed end of the cover, the collector having at least one external orifice which coincides with the at least one internal orifice, the at least one internal orifice and the at least one external orifice having a diameter which allows the passage of hummingbird beaks, but not the heads of bees.

DETAILED DESCRIPTION OF THE INVENTION

Figure 1:
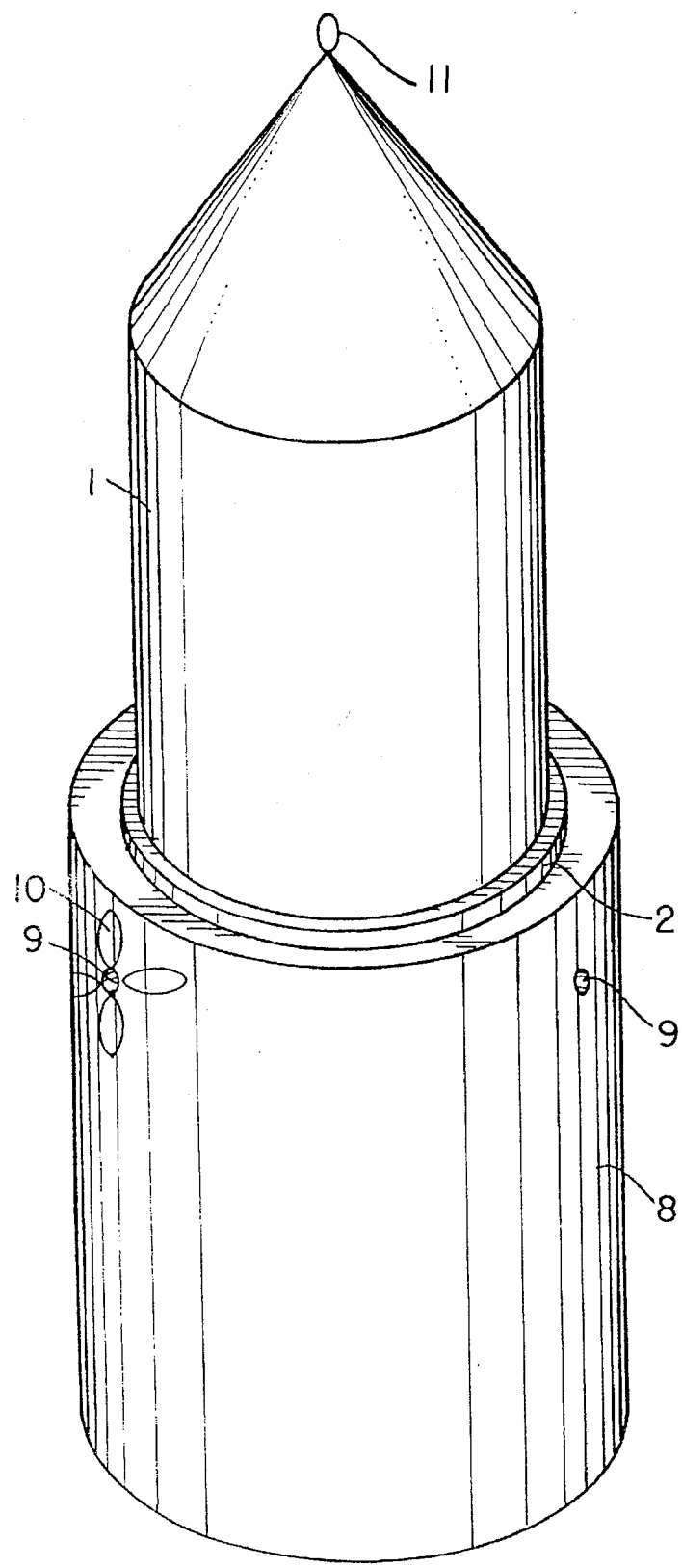
FIG. 1 is a perspective view of the preferred hummingbird feeder according to the present invention.
Figure 2:
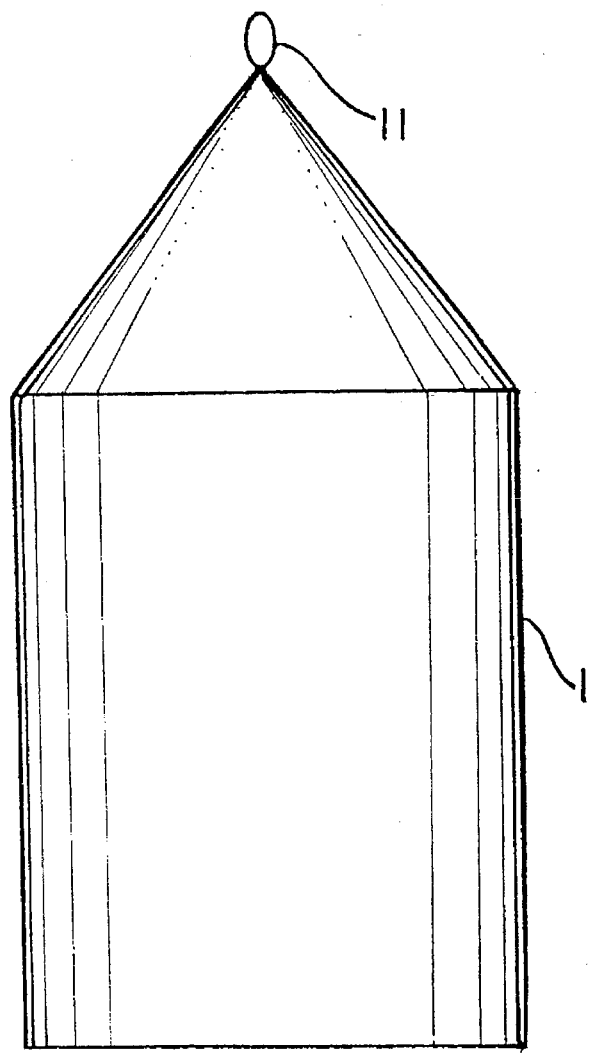
FIG. 2 is a front view of the preferred sugar water reservoir.
Figure 3:
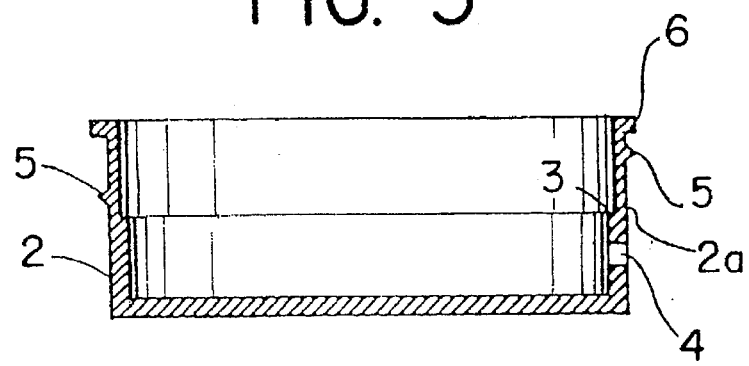
FIG. 3 is a sectional view of the preferred reservoir cover.
Figure 4:
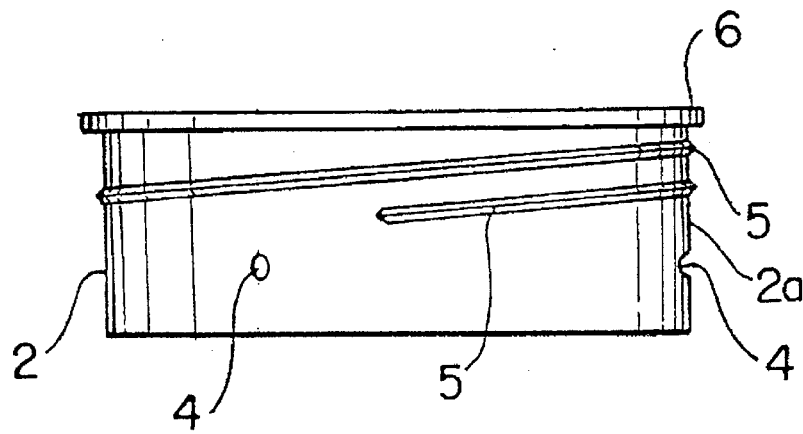
FIG. 4 is a front view of the preferred reservoir cover.
Figure 5:
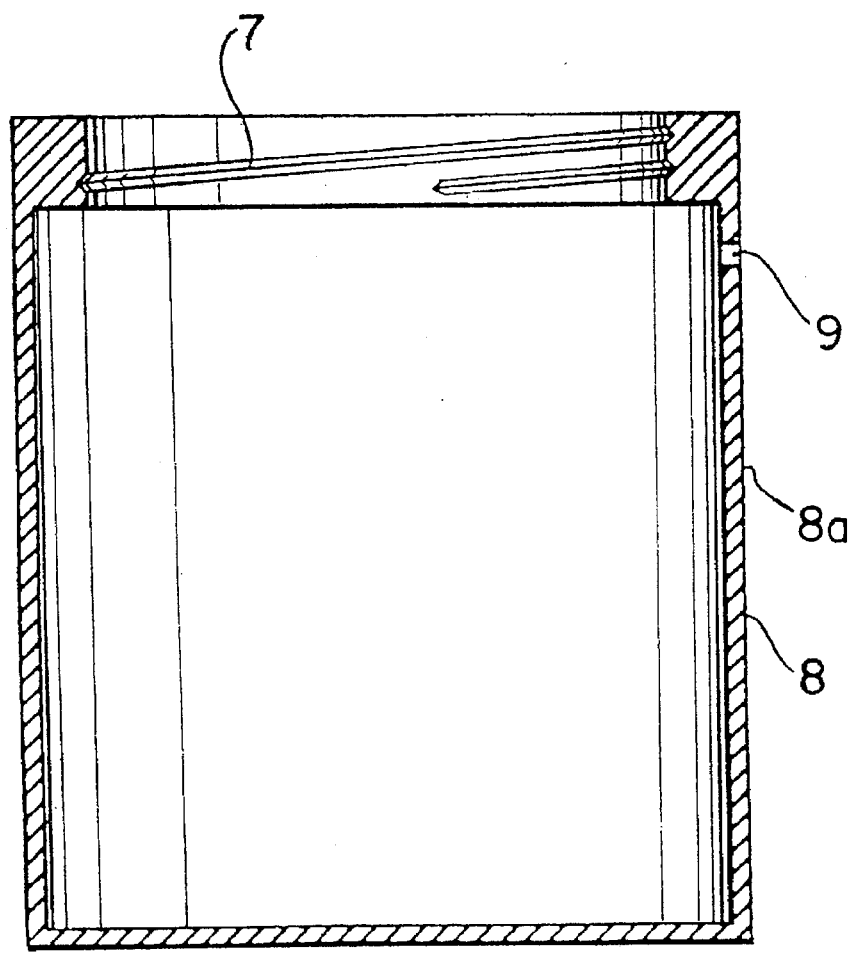
FIG. 5 is a sectional view of the preferred sugar water collector.

Referring to FIG. 1, the preferred hummingbird feeder is shown in accordance with the present invention and comprises a reservoir 1, provided with a cover 2 having an internal ridge 3. The ridge 3 limits the advance of the reservoir 1 after the cover engages the reservoir. The cover 2 is also provided with at least one orifice 4, which allows access to the sugar water solution. An overflow collector 8 is attached to this assembly by means of ridges 5, 6 and 7 or similar device. The overflow collector 8 has at least one orifice 9 which is aligned with the orifice 4 of the cover 2. Although the feeder may have only one set of aligned orifices 4, 9, the preferred feeder has a plurality of aligned orifices 4, 9. The orifices 4, 9 have a diameter which permits the passage of the beaks of hummingbirds, but not the heads of bees. Furthermore, the orifices 9 are surrounded by the figures of flowers 10, preferably painted on the external surface of the overflow collector 8. In addition, the entire feeder is preferably suspended by a handle 11.

The diameter of the orifices 4, 9 is preferably 2.5 mm and the flower figures are painted in bright colors to attract the hummingbirds. In addition, the distance between the outer wall 2a of the cover 2 and the outer wall 8a of the collector 8 is greater than the length of the bee proboscis but smaller than the reach of the hummingbird beak and tongue system. This distance is preferably 8 mm. The capacity of the collector 8 is similar to that of the reservoir 1 so that the system is still functional in the event that the reservoir 1 drains substantially into the collector 8.

In operation, the orifices 9 of the collector 8 are aligned with the orifices 4 of the cover 2. In this way, the hummingbirds may introduce their beaks through the outermost orifices 9, reaching the orifices 4 of the cover 2, and suck out the sugar water solution. Even with the orifices 4, 9 aligned, the bees cannot reach the solution because of the distance between the orifices 4, 9. In addition, the solution that leaks out of reservoir 1 is collected by the collector 8, without spilling to the ground and without providing access of the spilled solution to the bees. As a result, the sugar water solution is not wasted but can be returned to the reservoir 1 and unwanted bees are not attracted to the feeder.

As shown by the present invention, the two main problems affecting the hummingbird feeders currently in use, i.e., preventing bees from using the feeder and eliminating the leakage of sugar water solution from the system, are eliminated simultaneously.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed, such as a two part feeder comprising a reservoir 1 and collector 8, which also functions with aligning orifices 4, 9. Therefore, the invention is limited only by the appended claims.

What is claimed is:

1. A hummingbird feeder for preventing bees from feeding and eliminating leakage of a solution contained within the feeder, comprising:

a reservoir having an open end and a closed end for receiving the solution;

a cover having an open end and a closed end for retaining the solution within said reservoir, said open end of said cover engages said open end of said reservoir, said cover having at least one internal orifice which permits access to the solution; and an overflow collector having an open end and a closed end for receiving an overflow of the solution within said reservoir, said open end of said collector engages said closed end of said cover, said collector having at least one external orifice which coincides with said at least one internal orifice, said at least one internal orifice and said at least one external orifice having a diameter which allows the passage of hummingbird beaks, but not the heads of bees.

2. The hummingbird feeder of claim 1, further comprising a handle attached to said closed end of said reservoir.

3. The hummingbird feeder of claim 1, wherein said cover has an internal ridge which limits the advance of said reservoir after said cover engages said reservoir.

4. The hummingbird feeder of claim 3, wherein said overflow collector threadably engages said cover.

5. The hummingbird feeder of claim 1, wherein said reservoir slidably engages said cover using an interference fit.

6. The hummingbird feeder of claim 1, wherein said overflow collector threadably engages said cover.

7. The hummingbird feeder of claim 1, wherein said at least one external orifice is positioned on a side wall of said collector.

8. The hummingbird feeder of claim 7, wherein said at least one external orifice is positioned adjacent said open end of said collector.

9. The hummingbird feeder of claim 1, wherein said at least one internal orifice is positioned adjacent said closed end of said cover.

10. The hummingbird feeder of claim 1, wherein said at least one external orifice is substantially surrounded with a figure of a flower.

11. The hummingbird feeder of claim 10, wherein said figure of a flower is on an external surface of said collector.

12. The hummingbird feeder of claim 1, wherein said at least one internal orifice is located at a greater distance from said at least one external orifice than the length of the proboscis of the bees.

13. A hummingbird feeder for retaining a solution, comprising:

a reservoir for receiving the solution, said reservoir having at least one internal orifice which permits access to the solution; and an overflow collector having an open end and a closed end for receiving an overflow of the solution within said reservoir, said open end of said collector partially concentrically engages said reservoir, said collector having at least one external orifice which coincides with said at least one internal orifice, said at least one internal orifice and said at least one external orifice having a diameter which allows the passage of hummingbird beaks, but not the heads of bees.

14. The hummingbird feeder of claim 13, further comprising a handle attached to said reservoir.

15. The hummingbird feeder of claim 13, wherein said reservoir has an opening for introduction of the solution.

16. The hummingbird feeder of claim 13, wherein said collector threadably engages said cover.

17. The hummingbird feeder of claim 13, wherein said at least one external orifice is substantially surrounded with a figure of a flower.

18. The hummingbird feeder of claim 17, wherein said figure of a flower is on an external surface of said collector.

19. The hummingbird feeder of claim 13, wherein said at least one internal orifice is located at a greater distance from said at least one external orifice than the length of the proboscis of the bees.

* * * * *